United States Patent [19]

Wu

[11] Patent Number: 5,070,744
[45] Date of Patent: Dec. 10, 1991

[54] STRUCTURE OF BICYCLE CHAIN TRANSMISSION

[76] Inventor: Ching-Jung Wu, No. 13, Hsin Hsing Rd., Tainan, Taiwan

[21] Appl. No.: 608,778

[22] Filed: Nov. 5, 1990

Related U.S. Application Data

[63] Continuation-in-part of Ser. No. 559,918, Jul. 30, 1990.

[51] Int. Cl.$^5$ .............................................. G05G 1/14
[52] U.S. Cl. .................................. 74/594.3; 74/594.1; 74/594.2
[58] Field of Search .......................... 74/594.1–594.7

[56] References Cited

U.S. PATENT DOCUMENTS

| 935,495 | 9/1909 | Grout | 74/594.3 |
| 2,723,132 | 11/1955 | Oberwegner | 74/594.7 |
| 4,519,271 | 5/1985 | Chattin | 74/594.3 |
| 4,706,516 | 11/1987 | Xi | 74/594.1 |
| 4,807,491 | 2/1989 | Stuckenbrok | 74/594.1 |
| 4,960,013 | 10/1990 | Sander | 74/594.3 |

FOREIGN PATENT DOCUMENTS

| 2413253 | 7/1979 | France | 74/594.3 |
| 2487282 | 1/1982 | France | 74/594.3 |
| 2520692 | 8/1983 | France | 74/594.2 |
| 0083650 | 7/1981 | Japan | 74/594.3 |

Primary Examiner—Vinh T. Luong
Attorney, Agent, or Firm—Varndell Legal Group

[57] ABSTRACT

A bicycle chain transmission, comprising a pedal link adjustably fastened in a holder plate mounted on the outer side of a chain wheel and connected with a side projection of a bearing block which is mounted on an eccentric sleeve at the bottom of a bottom bracket bearing axle of a bicycle. The eccentric motion of the eccentric sleeve forces the bearing block to rotate eccentrically so as to squeeze the pedal link to adjust the length of its arm of force according to its angle position relative to the chain wheel, so that reduced labor consumption in pedaling can be achieved.

1 Claim, 3 Drawing Sheets

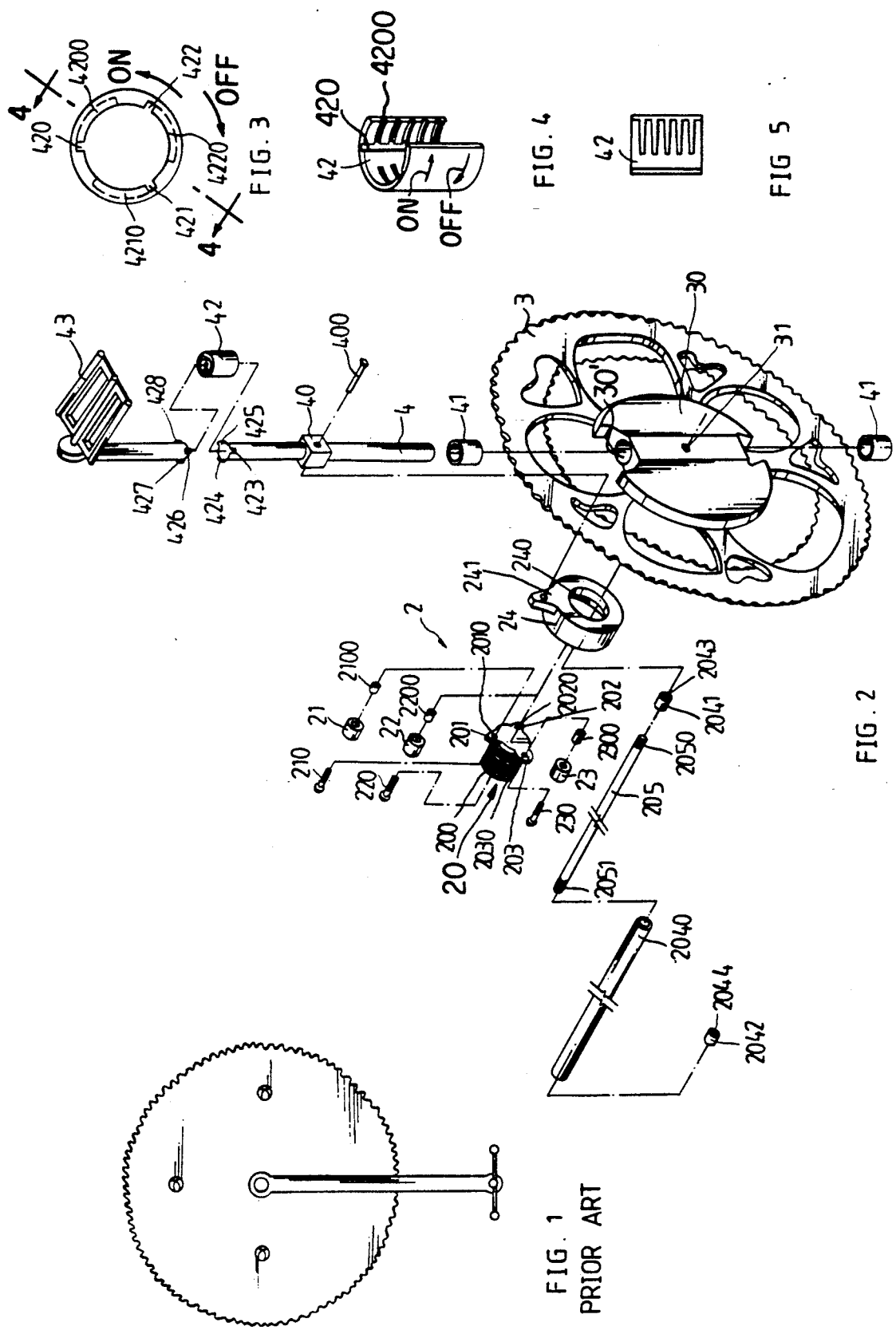

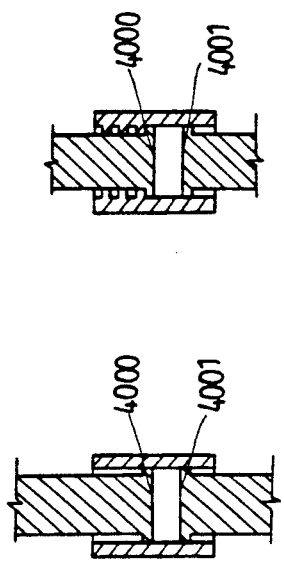
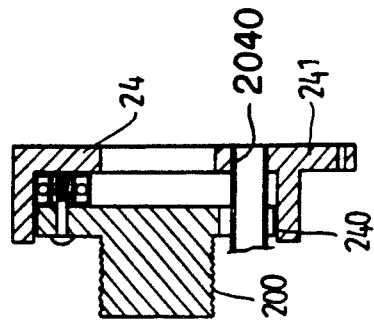
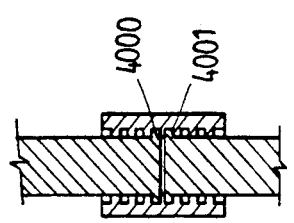
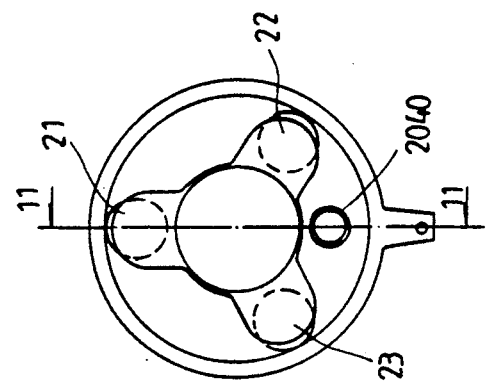
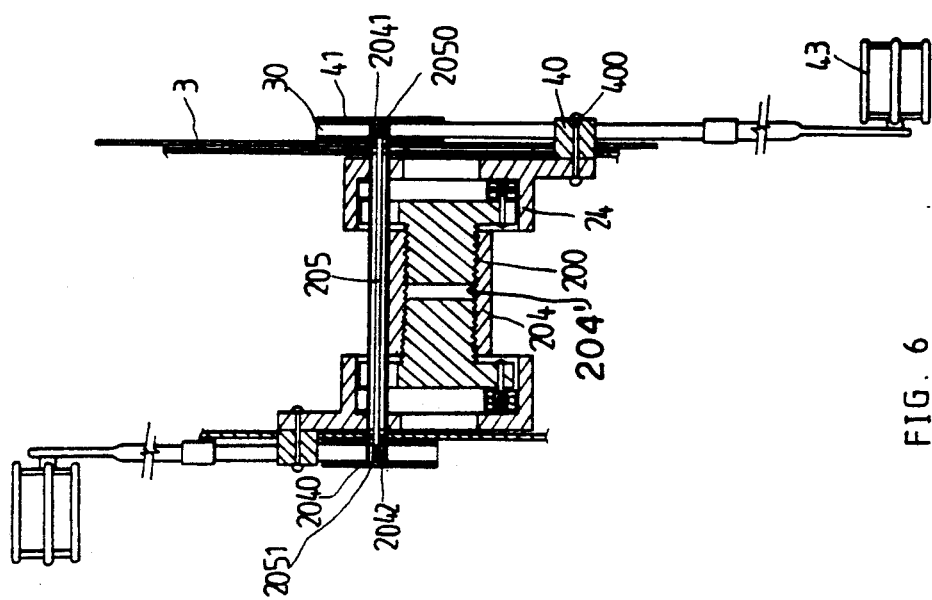

STRUCTURE OF BICYCLE CHAIN TRANSMISSION

CROSS-REFERENCE TO RELATED APPLICATION

The present invention is a continuation-in-part of patent application Ser. No. 07/559,918, filed on July 30, 1990, pending.

BACKGROUND OF THE INVENTION

Certain improvements have been made in the present invention so that the bicycle chain transmission can be efficiently operated on all kinds of road surface with minimum effort labor.

In a regular bicycle chain transmission, a crank is generally fastened in the center of a chain wheel. During pedaling, the moment arm of the crank does not make any change. It is known that a longer moment arm of a crank can minimize effort in forward pedaling. Therefore, there is a prior art structure employing a chain wheel of oval shape so that the moment arm of the crank can be automatically changed during its rotation. This type of design can effectively minimize effort in pedaling. However, a chain may be easily disengaged from an oval shaped chain wheel during rotation.

SUMMARY OF THE INVENTION

It is one object of the present invention to provide a bicycle chain transmission which can drive a bicycle to run with less effort and without causing the chain to disengage.

According to the present invention, a bicycle chain transmission is generally comprised of a bottom bracket bearing device mounted on an eccentric sleeve at the bottom of the bottom bracket bearing axle of a bicycle. The eccentric rotation of the eccentric sleeve forces the bearing block of the bottom bracket bearing device to rotate eccentrically so as to further force the pedal link to automatically adjust the length of its moment arm according to its angular position relative to the chain wheel. Therefore, less effort is required during pedaling.

BRIEF DESCRIPTION OF THE DRAWINGS

FIG. 1 is a plan view of a bicycle chain wheel according to the prior art;

FIG. 2 is a perspective exploded view of the preferred embodiment of bicycle chain transmission according to the present invention;

FIG. 3 is a top view of the cylindrical connector;

FIG. 4 is a perspective and partly sectional view of the cylindrical connector taken along line 4—4 of FIG. 3;

FIG. 5 is a the interior of a portion of elevational view of the cylindrical connector shown in FIG. 3;

FIG. 6 is a sectional assembly view of the preferred embodiment according to the present invention;

FIGS. 7 through 9 illustrate various positioning conditions of the two aligned parts of the pedal link in the cylindrical connector;

FIG. 10 illustrates the relative position of the eccentric sleeve, the spiral member and its connected bearings in the bearing block;

FIG. 11 is a sectional elevation taken along line 11—11 of FIG. 10;

Figure 14:
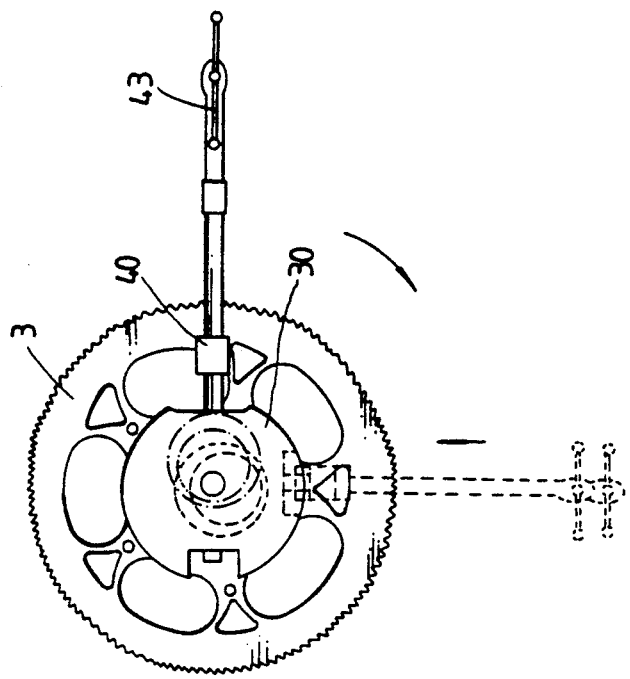
FIGS. 12 through 14 illustrate the operation of the present invention.

DETAILED DESCRIPTION OF THE PREFERRED EMBODIMENT:

Referring to FIGS. 2 and 6, a bicycle chain transmission in accordance with the present invention is generally comprised of a bottom bracket bearing device 2, a chain wheel 3 and a pedal link 4. The bottom bracket bearing device 2 is comprised of a spiral member 20 which has three lugs 201, 202 and 203 at the front, a plurality of bearings 21, 22 and 23 each of which has a bolt sleeve 2100, 2200 or 2300 fastened therein respectively and a bearing block 24 which has a center hole 240 for receiving the bearings. There are provided three screws 210, 220 and 230 respectively inserted through the round holes 2010, 2020 and 2030 on the lugs 201, 202 and 203, and screwed in the bolt sleeves 2100, 2200 and 2300 which are respectively fastened in the bearings 21, 22 and 23 and received inside the center hole 240 of the bearing block 24. The spiral member 20 has an outer thread 200 screwed into the bolt hole 204' of the bottom bracket bearing axle 204 of a bicycle. The bottom bracket bearing axle 204 has an eccentric sleeve 2040 (see FIG. 11) at the bottom. Two bearings 2041 and 2042 which have round holes 2043 and 2044 respectively through the central axes thereof are respectively fastened inside the eccentric sleeve 2040 at two opposite ends. There is a round rod 205 which has two outer thread portions 2050 and 2051 at its opposite ends inserted in the eccentric sleeve 2040. After assembly, the outer thread portion 2050 or 2051 is fastened in the bolt hole 31 of the bottom bracket bearing device holder 30 which is mounted on the outer side of the chain wheel 3. Further, the bearing block 24 has a unitary side projection 241 at one end, which is secured to a fixed plate 40 on the crank 4 by a lock pin 400. The pedal link 4 is fastened in a bore 30' the device holder 30. Two bearings 41 are mounted on the pedal link 4 and are respectively disposed at two opposite sides of the device holder 30. The pedal link 4 is comprised of two parts longitudinally aligned with each other and adjustably connected together by a cylindrical connector 42. The cylindrical connector 42 comprises three vertical grooves on the inner wall surface thereof and spaced 128° from one another, with a plurality of rows of tapered grooves 4200, 4210 and 4220 respectively transversely made therebetween (see FIGS. 3-5) for fastening the projecting strips 423, 424, 425, and 426, 427, 428, of the two aligned parts of the pedal link 4. Therefore, the total length of the pedal link 4 can be adjusted (see FIGS. 7 through 9) as desired. Further, there is a pedal 43 attached to the pedal link 4 at one end, by which the chain wheel 3 is rotated.

Upon rotation of the bottom bracket bearing device 2, the bearing block 24 is rotates eccentrically. The eccentric rotation of the bearing block 24 forces the pedal link 4 to change the length of its moment arm according to its angular position relative to the chain wheel 3.

Figure 13:
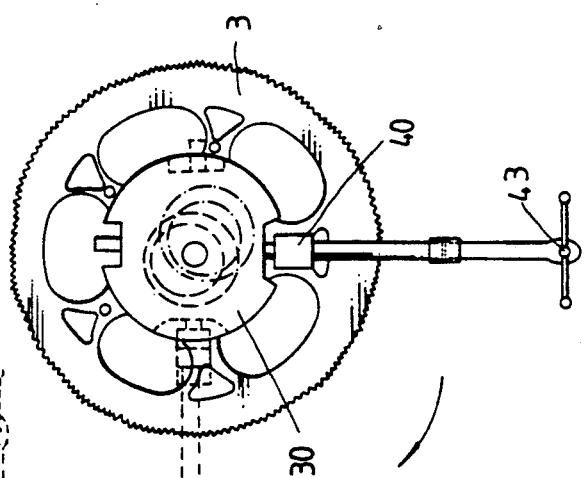
Figure 12:
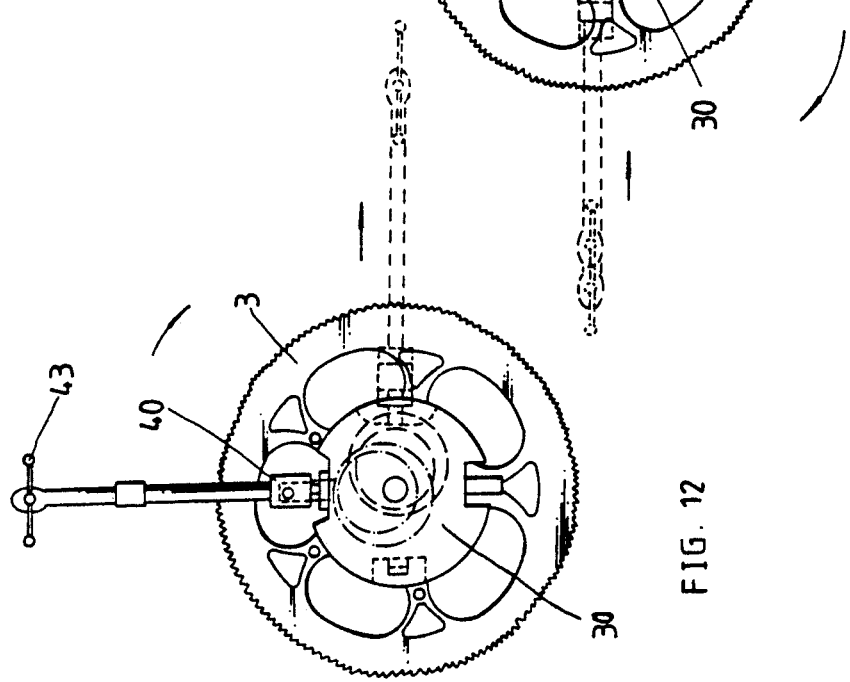

Referring to FIGS. 12-14, when the pedal link 4 is moved forward from a vertical position to a horizontal position, the eccentric sleeve 2040 on the bottom bracket bearing axle 204 forces the bearing block 24 to rotate eccentrically. During the eccentric motion of the bearing block 24, the pedal link 4 is simultaneously moved outwardly by the side projection 241, so as to increase its arm of force. When the pedal link 4 is continuously rotated downward from a horizontal position to a vertical position, it is pulled back by the side projection 241 of the bearing block 24 to shorten its moment arm. When the pedal link 4 is further rotated from a vertical position to a horizontal position, the moment arm of the pedal link 4 is at a minimum so that the pedal link 4 can be continuously rotated forward to a vertical position for the next stroke, with less effort.

As described above, the present invention provides a bicycle chain transmission, in which the moment arm of the pedal link is automatically adjusted during its rotation so that in pedaling effort can be minimized.

I claim:

1. A bicycle chain transmission, comprising:

a bottom bracket bearing device comprising a bearing block having a hole at the center and a side projection at one end, a spiral member having three lugs at one end, a plurality of bearings each having a bolt sleeve respectively secured to one of said lugs and received in the center hole of said bearing block, said spiral member having an outer thread screwed into a bolt hole in a bottom bracket bearing axle of a bicycle, said bottom bracket bearing axle having an eccentric sleeve at the bottom, said eccentric sleeve having two bearings fastened at opposite ends thereof and a round rod inserted therethrough, said round rod having two outer thread portions at said opposite ends;

a chain wheel assembly comprising two sprocket wheels of different size connected together side by side, having a holder plate at one side, said holder plate having a bolt hole for fastening said out thread portions of said round rod; and a pedal link movably inserted in a bore in said holder plate, said link having a fixed plate at the middle thereof connected to the side projection of said bearing block, and a pedal attached to one end of said link for pedaling, said pedal link comprising two parts longitudinally aligned with each other and movably connected together by a cylindrical connector, said cylindrical connector comprising an inner wall having three grooves vertically made thereon and spaced from one another at equal interval with a plurality of rows of tapered grooves transversely made therebetween for alternatively fastening a plurality of projecting strips on the connecting end of the two aligned parts of said pedal link;

wherein rotation of said eccentric sleeve forces said bearing block to rotate eccentrically, so as to move said pedal link to automatically adjust its moment arm according to the angular position of said pedal link relative to said chain wheel assembly.

* * * * *